United States Patent
Hakoishi

(10) Patent No.: US 8,878,930 B2
(45) Date of Patent: Nov. 4, 2014

(54) IMAGE-CAPTURING DEVICE MOUNTING MECHANISM AND IMAGE-CAPTURING DEVICE

(75) Inventor: Takahisa Hakoishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 713 days.

(21) Appl. No.: 12/707,901

(22) Filed: Feb. 18, 2010

(65) Prior Publication Data

US 2010/0245569 A1    Sep. 30, 2010

(30) Foreign Application Priority Data

Mar. 26, 2009    (JP) .................. 2009-076406

(51) Int. Cl.
*H04N 7/18*    (2006.01)
*G08B 13/196*    (2006.01)

(52) U.S. Cl.
CPC .......... *H04N 7/185* (2013.01); *G08B 13/19632* (2013.01); *G08B 13/19619* (2013.01)
USPC ............ 348/143; 348/151; 348/155; 396/329

(58) Field of Classification Search
CPC .................................... H04N 5/2253
USPC ................................. 348/143, 151
See application file for complete search history.

(56) References Cited

U.S. PATENT DOCUMENTS

| | | | | |
|---|---|---|---|---|
| 5,383,625 A | * | 1/1995 | Uehara et al. ................. | 242/572 |
| 6,186,455 B1 | * | 2/2001 | Hollingsworth et al. | 248/220.31 |
| 6,268,882 B1 | * | 7/2001 | Elberbaum .................... | 348/151 |
| 2004/0048507 A1 | * | 3/2004 | Hage ............................. | 439/332 |
| 2007/0019947 A1 | * | 1/2007 | Shimada ........................ | 396/329 |
| 2008/0055409 A1 | * | 3/2008 | Mars et al. .................... | 348/143 |
| 2008/0151055 A1 | * | 6/2008 | Elsemore ...................... | 348/155 |

FOREIGN PATENT DOCUMENTS

| | | |
|---|---|---|
| JP | 2001-24915 | 1/2001 |
| JP | 2003-189138 | 7/2003 |
| JP | 2006-208446 | 8/2006 |
| JP | 2008-92258 | 4/2008 |

* cited by examiner

*Primary Examiner* — Glenford Madamba
(74) *Attorney, Agent, or Firm* — Oblon, Spivak, McClelland, Maier & Neustadt, L.L.P.

(57) ABSTRACT

An image-capturing device mounting mechanism, which includes: an anchoring unit fixed to a building; a body unit with a capturing lens, the body unit mounted to and demounted from the anchoring unit; a first engaging portion provided in the body unit for an engagement between the body unit and the anchoring unit when the body unit is mounted to the anchoring unit; and a second engaging portion provided in the body unit for an engagement between the body unit and the anchoring unit when the first engaging portion engages the anchoring unit.

9 Claims, 13 Drawing Sheets

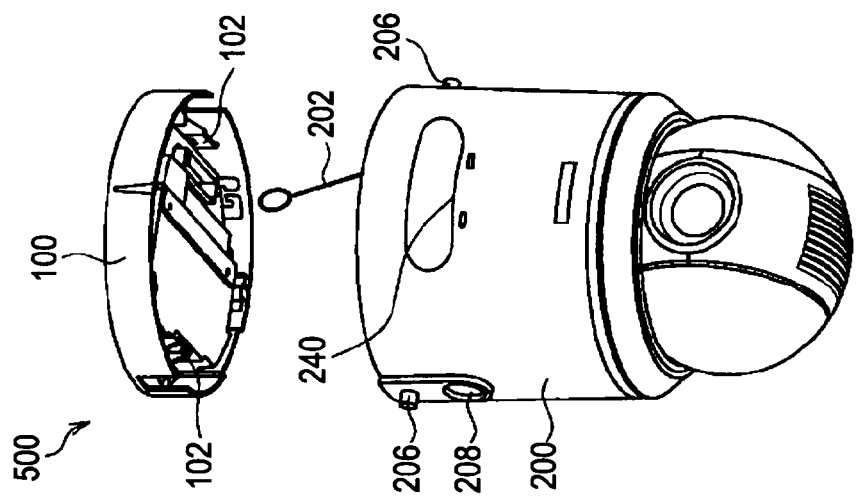
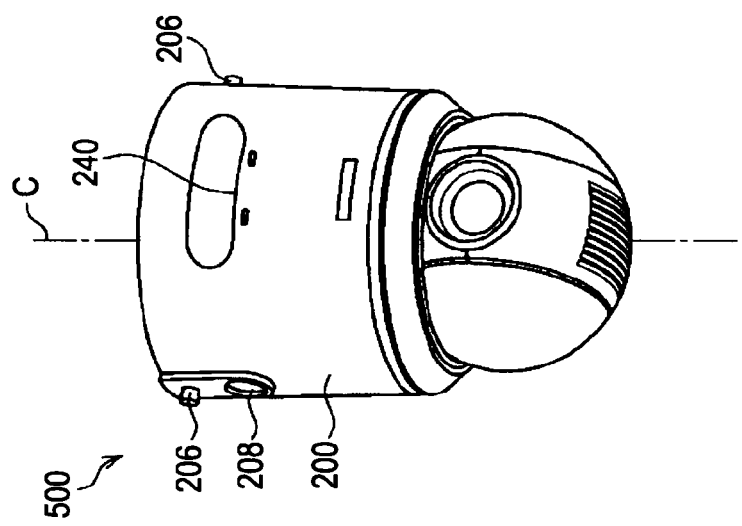
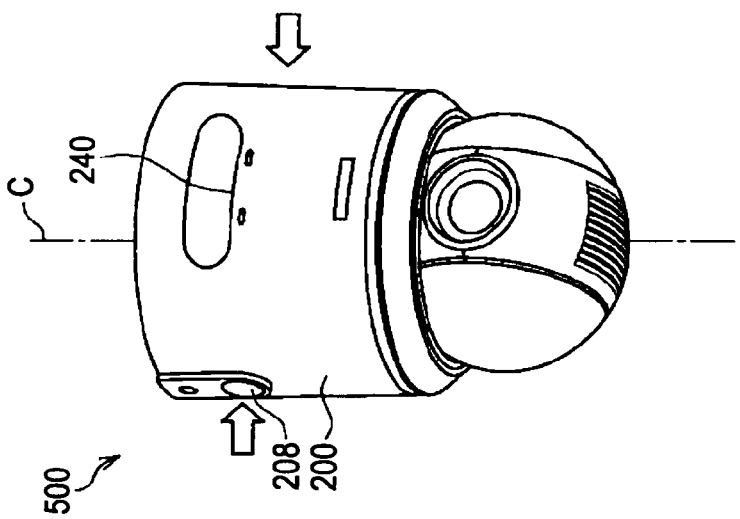

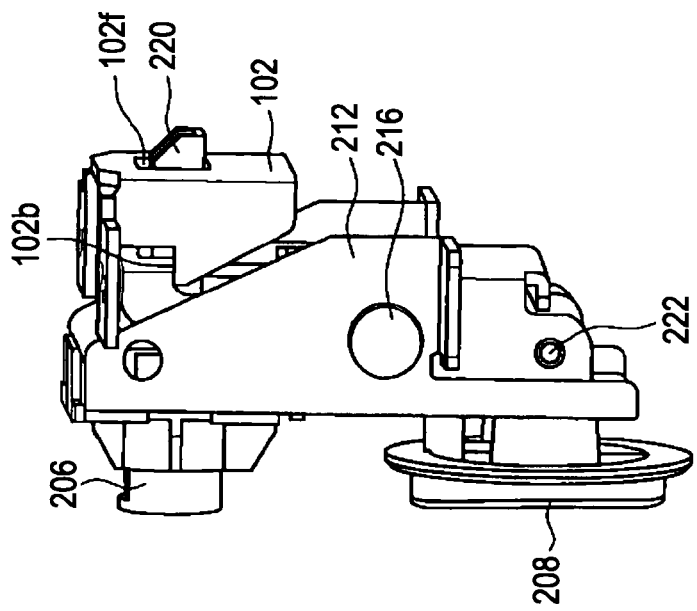
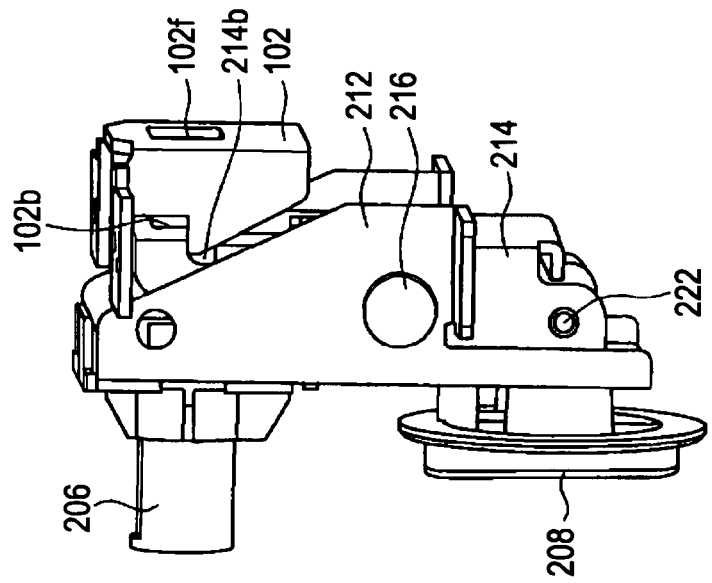

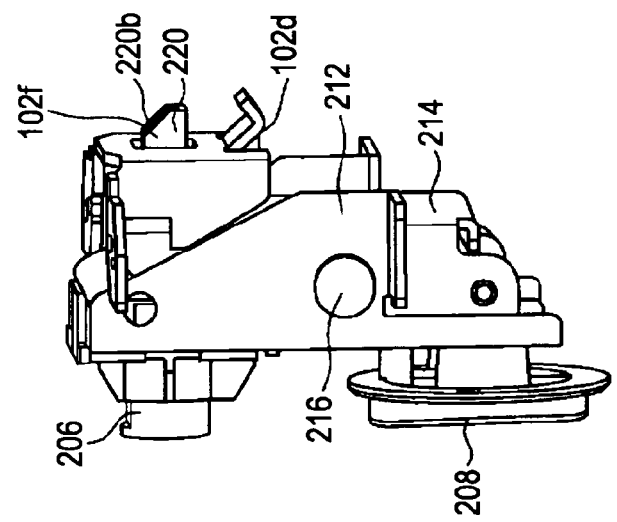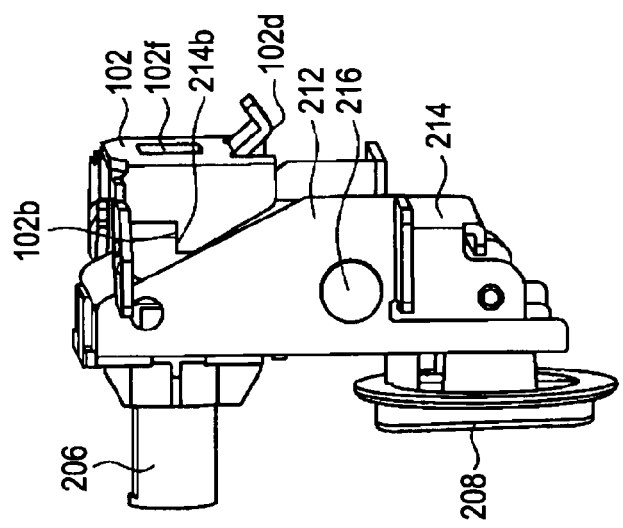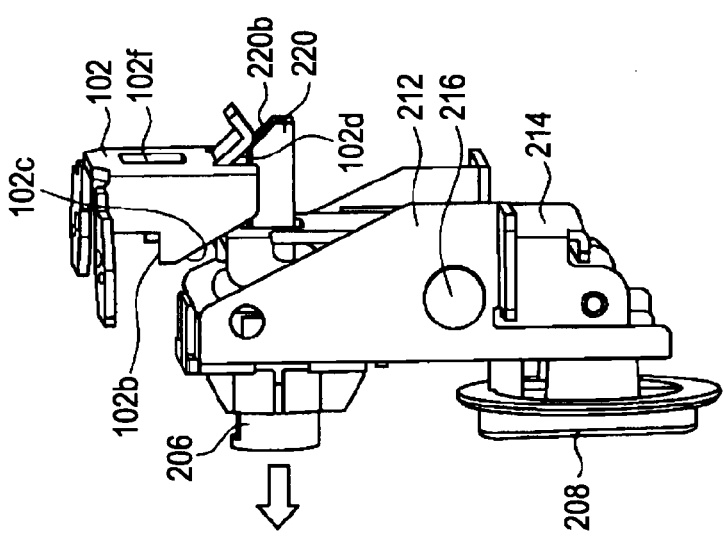

IMAGE-CAPTURING DEVICE MOUNTING MECHANISM AND IMAGE-CAPTURING DEVICE

CROSS REFERENCE

This application claims the benefit of priority under 35 U.S.C. §119 from Japanese Patent Application No. 2009-076406, filed Mar. 26, 2009.

BACKGROUND OF THE INVENTION

1. Field of the Invention

The present invention relates to an image-capturing device mounting mechanism and an image-capturing device.

2. Description of the Related Art

Camera devices designed to facilitate installation and removal for maintenance of security camera devices at high places, such as a ceiling and a wall surface, have been proposed (see Japanese Unexamined Patent Application Publication Nos. 2003-189138, 2008-92258, 2006-208446 and 2001-24915).

SUMMARY OF THE INVENTION

Camera devices installed in ceilings or other places are designed to capture images over a wide area for monitoring purposes. These camera devices include a mechanism, such as a motor, for changing angles of its lens. The camera devices should be removed regularly for the purposes of repair and maintenance.

Although the camera devices may be designed to be removable, a camera body unit of such camera devices may be mounted to an on-ceiling anchoring member in an unstable manner. Such an unstable mounting state may cause problems of an incomplete electrical connection between the on-ceiling anchoring member and a camera body or an inadvertent removal of the camera body unit from the on-ceiling anchoring member.

It is therefore desirable to provide a novel and improved image-capturing device mounting mechanism and an image-capturing device with which a body unit with a capturing lens can be anchored securely to an anchoring unit provided at a ceiling, a wall surface or other places.

An image-capturing device mounting mechanism according to an embodiment of the invention includes: an anchoring unit fixed to a building; a body unit with a capturing lens, the body unit mounted to and demounted from the anchoring unit; a first engaging portion provided in the body unit for an engagement between the body unit and the anchoring unit when the body unit is mounted to the anchoring unit; and a second engaging portion provided in the body unit for an engagement between the body unit and the anchoring unit when the first engaging portion engages the anchoring unit.

The second engaging portion may be pushed in by a used to engage the anchoring unit when the first engaging portion and the anchoring unit are in engagement with each other.

The image-capturing device mounting mechanism may further include an operating section for operating the second engaging portion, the operating section projecting from an outer surface of the body unit when the second engaging portion and the anchoring unit are not in engagement with each other.

A disengaging direction of the first engaging portion and a disengaging direction of the second engaging portion may be the same and the second engaging portion and the anchoring unit may be disengaged from each other when the first engaging portion and the anchoring unit are disengaged from each other.

The image-capturing device mounting mechanism may further include: a first operating section provided in an outer surface of the body unit for operating the first engaging portion; and a second operating section provided in the outer surface of the body unit for operating the second engaging portion, in which the first operating section is disposed below the second operating section.

An area of the first operating section in the outer surface of the body unit may be larger than an area of the second operating section in the outer surface of the body unit.

The anchoring unit may include a retracting section for retracting the second engaging portion to a position at which the second engaging portion and the anchoring unit are not in engagement with each other during mounting the body unit to the anchoring unit.

An image-capturing device according to an embodiment of the invention may include: an anchoring unit fixed to a building; a body unit with a capturing lens, the body unit mounted to and demounted from the anchoring unit; a first engaging portion provided in the body unit for an engagement between the body unit and the anchoring unit when the body unit is mounted to the anchoring unit; and a second engaging portion provided in the body unit for an engagement between the body unit and the anchoring unit when the first engaging portion engages the anchoring unit.

The image-capturing device may further include: a locking mechanism provided in the body unit, the locking mechanism including the first and second engaging portions; a first connector provided in the anchoring unit for establishing an electrical connection between the anchoring unit and the body unit; a second connector provided in the body unit to be connected to the first connector; and a circuit board provided in the body unit on which the second connector is mounted, in which: the body unit is cylindrically shaped; two locking mechanism sections are provided at an outer circumferential surface of the body unit at opposing locations spaced 180 degrees apart from each other; and the second connector is provided in the same angular position as that of one of the two locking mechanisms with respect to a central axis of the cylindrical-shaped body unit.

A card connector may be mounted on the circuit board for receiving a wireless LAN card or a memory card, the card connector being located apart from one of the locking mechanism sections at 90 degrees about the central axis of the cylindrical-shaped body unit.

According to the embodiments of the invention, a body unit with an image-capturing lens can be anchored securely to an anchoring unit provided at a ceiling, a wall surface or other places.

BRIEF DESCRIPTION OF THE DRAWINGS

FIGS. 2A to 2C schematically illustrate demounting of a body unit from a ceiling unit in the monitoring camera device;

FIGS. 8A and 8B schematically illustrate disposing of a lock shaft to pass through an opening of the hook fitting when the locking mechanism and the hook fitting are in engagement with each other FIGS. 9A and 9B schematically illustrate retraction of the lock shaft from the opening of the hook fitting during demounting of the body unit from the ceiling unit;

FIGS. 10A to 10C schematically illustrate mounting of the body unit to the ceiling unit with a lock button located at a pushed-in position;

DESCRIPTION OF THE PREFERRED EMBODIMENTS

Figure 1A:
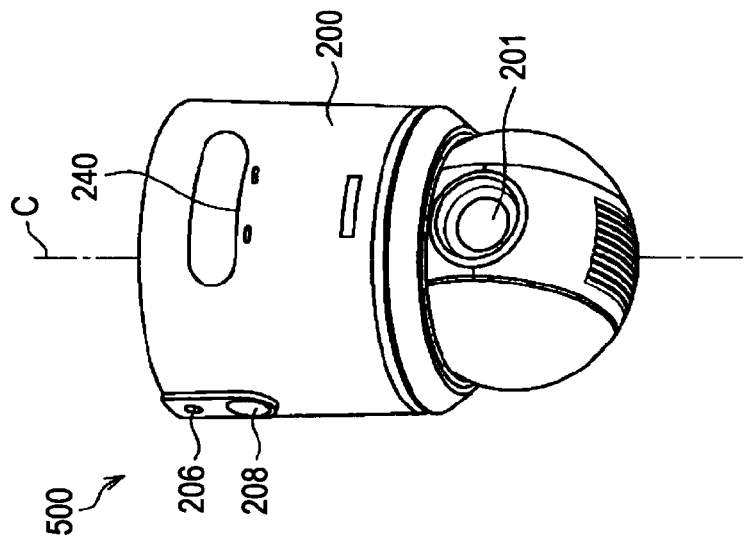
FIGS. 1A to 1C schematically illustrate an overall structure of a monitoring camera device according to an embodiment of the invention.

Referring now to the accompanying drawings, a preferred embodiment of the invention will be described in detail. Components having substantially the same functional configurations are denoted by the same reference numerals and duplicate description thereof will be omitted.

Figure 1B:
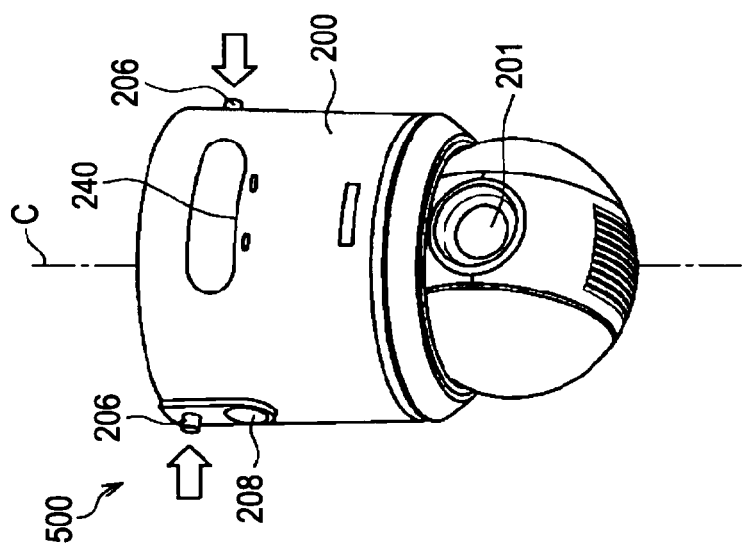
Figure 1C:
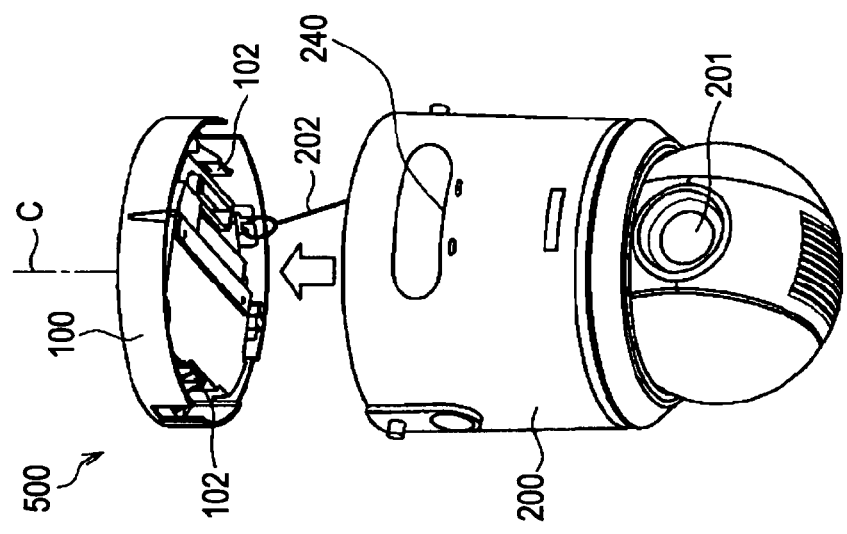

Description will be given in the following order.
1. Overall Structure of Monitoring Camera Device
2. Configuration of Locking Mechanism Section
3. Configuration of Lock Button
4. Planar Configuration of Body Unit
1. Overall Structure of Monitoring Camera Device FIGS. 1A to 1C schematically illustrate an overall structure of a monitoring camera device 500 according to an embodiment of the invention. The monitoring camera device 500 is installed at any locations of buildings, such as an indoor ceiling and a wall surface. As illustrated in FIGS. 1A to 1C, the monitoring camera device 500 includes a ceiling unit 100 and a body unit 200.

The ceiling unit 100 is fixed to a ceiling. The body unit 200 is removably mounted to the ceiling unit 100. The body unit 200 includes a lens 201, image sensors, such as charge-coupled devices (CCDs), and a circuit board. The lens 201 is used to capture images. The image sensors capture the images formed by the lens 201. The circuit board processes signals output from the image sensors. The body unit 200 includes a card receiving section 240 for receiving a wireless LAN card for wireless LAN communication or a memory card for recording the captured images.

The body unit 200 is configured to be mounted to and demounted from the ceiling unit 100 for maintenance or other purposes. FIGS. 1A to 1C illustrate a procedure of mounting the body unit 200 to the ceiling unit 100. In the mounting operation of the body unit 200 to the ceiling unit 100, as illustrated in FIG. 1A, an end of a safety-catch wire 202 of the body unit 200 is anchored at a predetermined position of the ceiling unit 100. The relative angular positions of the ceiling unit 100 and the body unit 200 are determined. In order to facilitate determination of the relative angular positions of the ceiling unit 100 and the body unit 200, the body unit 200 has plural bosses and the ceiling unit 100 has boss holes which receive the bosses of the body unit 200, which will be described later. The body unit 200 is then pushed into the ceiling unit 100 so that hook fittings 102 of the ceiling unit 100 and lock plates 214 of the body unit 200, which will be described later, engage each other. In this manner, the body unit 200 is mounted to the ceiling unit 100.

The body unit 200 includes lock buttons 206. After the body unit 200 and the ceiling unit 100 are aligned with each other, the lock buttons 206 are pushed in by a user as illustrated in FIG. 1B. When the lock buttons 206 are pushed in, the mounting operation of the monitoring camera device 500 is completed as illustrated in FIG. 1C.

FIGS. 2A to 2C schematically illustrate a procedure of demounting the body unit 200 from the ceiling unit 100 of the monitoring camera device 500. In the demounting operation of the body unit 200, release buttons 208 are first pushed in by the user. When the release buttons 208 are pushed in, the lock plates 204 of the body unit 200 and the hook fittings 102 of the ceiling unit 100 are disengaged from each other, which will be described later (see FIG. 2B). Accordingly, the body unit 200 can be moved downward as illustrated in FIG. 2C. The safety-catch wire 202 is then removed from the ceiling unit 100 to complete the demounting operation of the body unit 200 from the ceiling unit 100.

2. Configuration of Locking Mechanism Section

Figure 3:
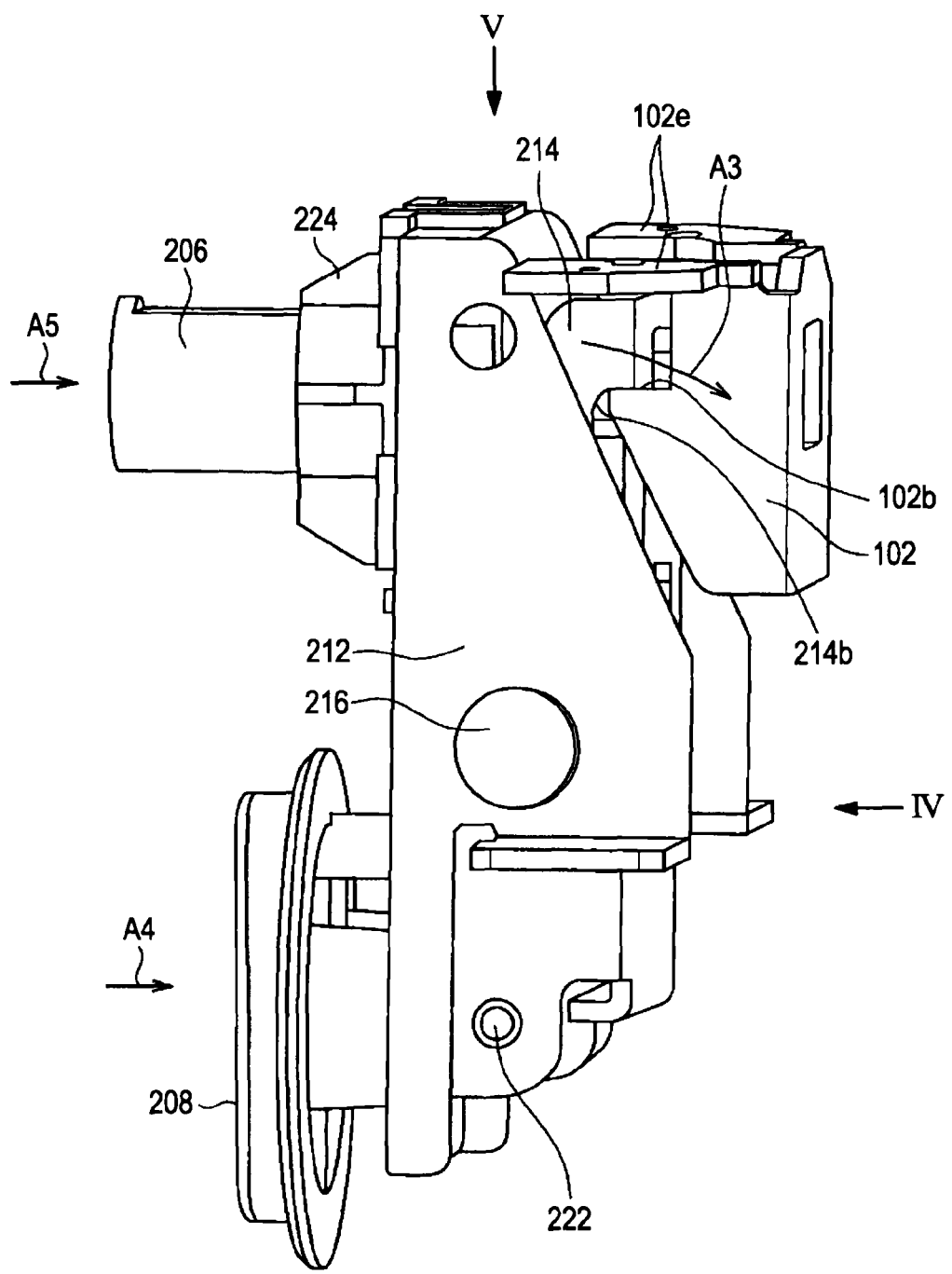
FIG. 3 schematically illustrates a configuration of a locking mechanism section which includes a lock button and a release button.
Figure 4:
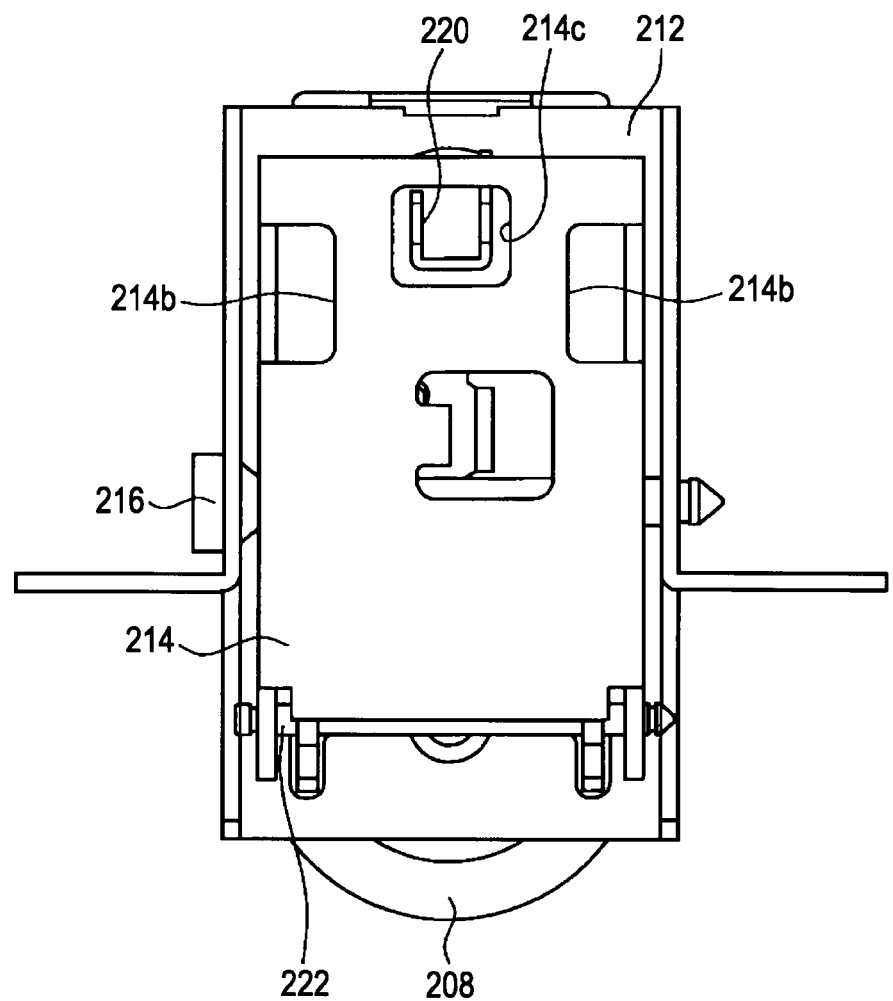
FIG. 4 schematically illustrates the locking mechanism section seen from a direction of arrow IV in FIG. 3.
Figure 5:
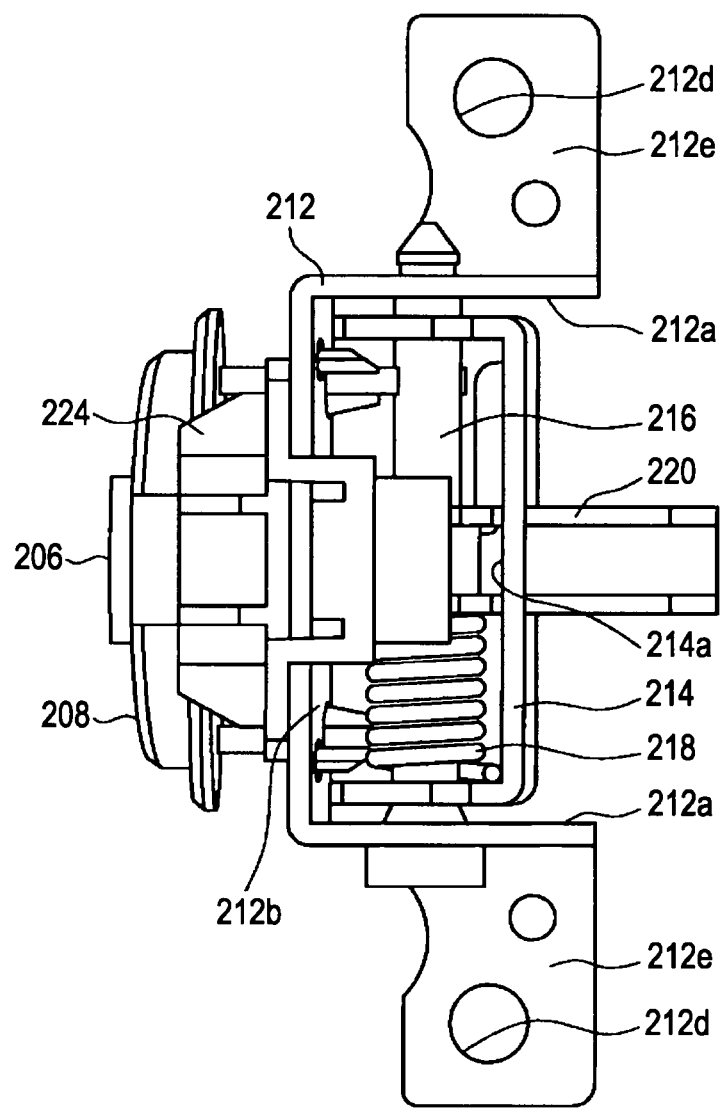
FIG. 5 schematically illustrates the locking mechanism section seen from a direction of arrow V in FIG. 3.

FIG. 3 schematically illustrates a configuration of a locking mechanism section 210 which includes a lock button 206 and a release button 208. FIG. 3 illustrates a state in which the body unit 200 is mounted to the ceiling unit 100 and the hook fitting 102 of the ceiling unit 100 and the lock plate 214 of the locking mechanism section 210 engage each other. FIG. 4 schematically illustrates the locking mechanism section 210 seen from a direction of arrow IV in FIG. 3. FIG. 5 schematically illustrates the locking mechanism section 210 seen from a direction of arrow V in FIG. 3. As illustrated in FIGS. 1A to 2C, two locking mechanism sections 210 are provided at the cylindrical-shaped body unit 200 at opposing locations spaced 180 degrees apart from each other about a central axis C of the body unit 200. Similarly, two hook fittings 102 are provided at the ceiling unit 100 at opposing locations spaced 180 degrees apart from each other about the central axis C of the body unit 200 so as to correspond to the positions of the locking mechanism sections 210, as illustrated in FIG. 1A.

As illustrated in FIGS. 3 to 5, each locking mechanism section 210 includes a lock button 206, a release button 208, a base plate 212, a lock plate 214, a shaft 216, a twisted coil spring 218, a lock shaft 220 and a shaft 222.

As illustrated in FIG. 5, the base plate 212 is substantially U-shaped when seen from above. The lock plate 214 is disposed between opposing surfaces 212a of the base plate 212. The base plate 214 is also substantially U-shaped when seen from above. The shaft 216 is disposed to pass through the base plate 212 and the lock plate 214. The lock plate 214 is rotatable with respect to the base plate 212 about the shaft 216.

The shaft 216 is disposed in the twisted coil spring 218 as illustrated in FIG. 5. The twisted coil spring 218 abuts a surface 214a of the lock plate 214 at one end and abuts a surface 212b of the base plate 212 at the other end. The twisted coil spring 218 applies urging force to the lock plate 214 to pivot about the shaft 216 in the direction of arrow A3 in FIG. 3. As illustrated in FIG. 4, the lock plate 214 has two openings 214b at positions where the lock plate 214 is folded at 90 degrees.

Figure 6:
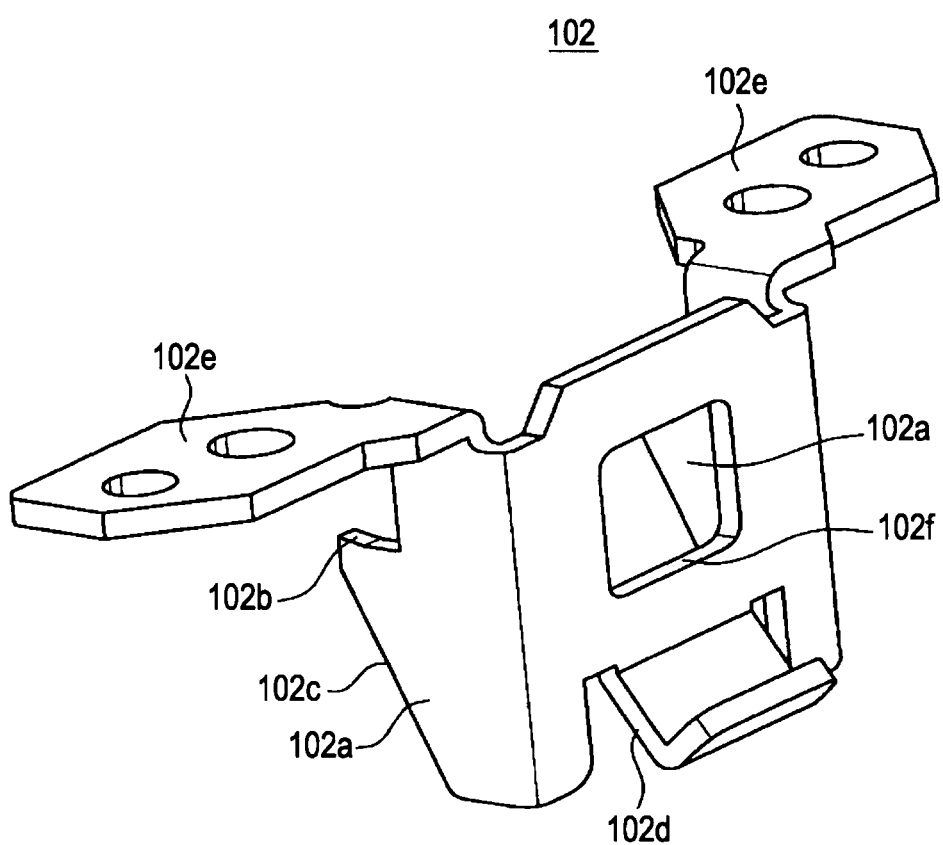
FIG. 6 is a perspective view illustrating a hook fitting provided in the ceiling unit.

FIG. 6 is a perspective view of the hook fitting 102 provided in the ceiling unit 100. The hook fitting 102 is substantially U-shaped when seen from above. A body of the hook fitting 102 is folded to form two wing sections 102a. Each of the wing sections 102a has an engaging portion 102b. The hook fitting 102 also has sloped surfaces 102c and a sloped surface 102d. The hook fitting 102 is fixed to the ceiling unit 100 with mounting surfaces 102e thereof abutting the ceiling unit 100. Two hook fittings 102 are provided at the ceiling unit 100 at opposing locations spaced 180 degrees apart from each other about the central axis C of the body unit 200 with the engaging portions 102b facing outward.

As illustrated in FIG. 3, when the body unit 200 is mounted to the ceiling unit 100, the engaging portions 102b of the hook fitting 102 and upper ends of the openings 214b of the lock plate 214 abut each other. The lock plate 214 is urged in the direction of arrow A3 in FIG. 3 with the urging force of the twisted coil spring 218. The urging force of the twisted coil spring 218 reliably maintains the engagement between the lock plate 214 and the hook fitting 102.

The body unit 200 is moved toward the ceiling unit 100 to be mounted thereto. As the body unit 200 is moved toward the ceiling unit 100, relative positions of the lock plate 214 and the hook fitting 102 change while an upper end of the lock plate 214 is in abutment with the sloped surface 102c. In the course of mounting the body unit 200 to the ceiling unit 100, the lock plate 214 is made to pivot in a direction opposite to the direction of arrow A3 in FIG. 3 against the urging force of the twisted coil spring 218. When the engaging portions 102b of the hook fitting 102 and the upper ends of the opening 214b are brought to the same height positions, then the lock plate 214 pivots in the direction of arrow A3. In this manner, the wing sections 102a of the hook fitting 102 are disposed inside the openings 214b and the engaging portions 102b of the hook fitting 102 engage the openings 214b.

Figure 7:
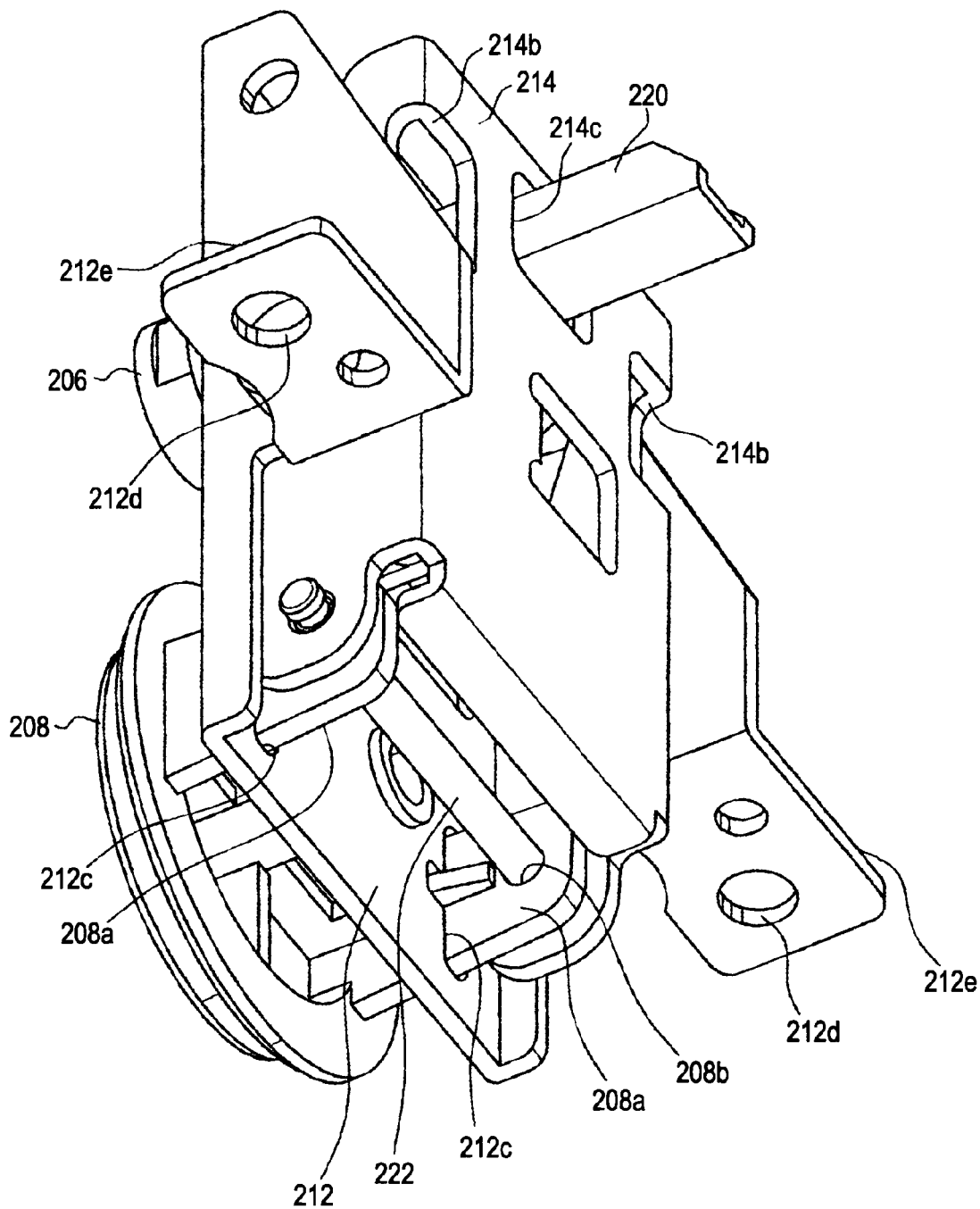
FIG. 7 is a perspective view illustrating a lower section of the locking mechanism section.

FIG. 7 is a perspective view of a lower section of the locking mechanism section 210. The release button 208 is attached to the lower section of the lock plate 214. The release button 208 is made of resin or other materials. As illustrated in FIG. 7, two protruding sections 208a protruding from a back side of the release button 208 are disposed to pass through two openings 212c formed in the base plate 212. The shaft 222 is provided at the lower portion of the lock plate 214. The shaft 222 is disposed to pass through openings 208b formed in the protruding sections 208a. With this configuration, the lock plate 214 is pivotably connected to the release button 208.

As illustrated in FIG. 7, the base plate 212 has mounting surfaces 212e and screw holes 212d with which the base plate 212 is fixed to the body unit 200.

At the time of demounting the body unit 200 from the ceiling unit 100, the release button 208 of each locking mechanism section 210 is pushed in in the direction of arrow A4 in FIG. 3. The lock plate 214 is then made to pivot in a direction opposite to the direction of arrow A3 in FIG. 3 and the engaging portions 102b of the hook fitting 102 and the upper ends of the openings 214b are disengaged from each other. The body unit 200 is then demounted from the ceiling unit 100.

3. Configuration of Lock Button

Next, a configuration of the lock button 206 in the monitoring camera device 500 according to the present embodiment will be described. The lock button 206 is disposed and supported in an opening of a holder 224 which is fixed to the base plate 212. The lock button 206 can be pushed in or retracted along the direction of arrow A5 in FIG. 3. The lock button 206 is formed integrally with the lock shaft 220. As illustrated in FIGS. 4 and 7, the lock shaft 220 is disposed to pass through an opening 214c formed in the lock plate 214.

As illustrated in FIG. 6, the hook fitting 102 has an opening 102f. The opening 102f is formed at a position corresponding to the position of the lock shaft 220 when the locking mechanism 210 and the hook fitting 102 are in engagement with each other.

FIGS. 8A and 8B schematically illustrate disposing of the lock shaft 220 to pass through the opening 102f of the hook fitting 102 when the locking mechanism 210 and the hook fitting 102 are in engagement with each other. FIG. 8A illustrates a state in which the body unit 200 is mounted to the ceiling unit 100 and the openings 214b of the lock plate 214 and the engaging portions 102b of the hook fitting 102 are in engagement with each other. In this state, as described above, the positions of the lock shaft 220 and the opening 102f correspond to each other.

FIG. 8B illustrates a state in which the lock button 206 is pushed in from the state illustrated in FIG. 8A. When the lock button 206 is pushed in, the lock shaft 220 formed integrally with the lock button 206 is moved and an end of the lock shaft 220 is disposed to pass through the opening 102f. Thus, the lock shaft 220 and the opening 102f engage each other.

With the lock shaft 220 and the opening 102f being in engagement with each other, the body unit 200 is not demounted from the ceiling unit 100 in the event that the engaging portions 102b of the hook fitting 102 and the openings 114b are disengaged from each other. With this configuration, inadvertent removal of the body unit 200 from the ceiling unit 100 can be avoided in the event that the lock plate 114 and the hook fitting 102 are disengaged from each other against the urging force of the twisted coil spring 218.

According to the present embodiment, the ceiling unit 100 and the body unit 200 engage each other by two different mechanisms: the engagement between the lock plate 214 and the engaging portions 102b of the hook fitting 102; and the engagement between the lock shaft 220 and the opening 102f. With this configuration, the body unit 200 and the ceiling unit 100 can be more reliably connected to each other.

In a state in which the body unit 200 is not completely mounted to the ceiling unit 100 and thus the engaging portions 102b of the hook fitting 102 and the openings 114b are not in engagement with each other, the lock button 206 is not successfully pushed in because the lock shaft 220 and the opening 102f are not yet aligned with each other. The user can confirm the engagement state of the engaging portions 102b of the hook fitting 102 and the openings 114b of the lock plate 214 by examining that the lock button 206 has been pushed in.

The movement of the lock button 206 when being pushed in is relatively large. The lock button 206 projects from an outer circumferential surface of the body unit 200 when it is not pushed in. The user can easily confirm the engagement state of the body unit 200 with the ceiling unit 100 by examining the position of the lock button 206 from the appearance. Since the position of the lock button 206 can be recognized from the appearance, the user reliably confirms the engagement state of the body unit 200 with the ceiling unit 100.

Figure 9B:
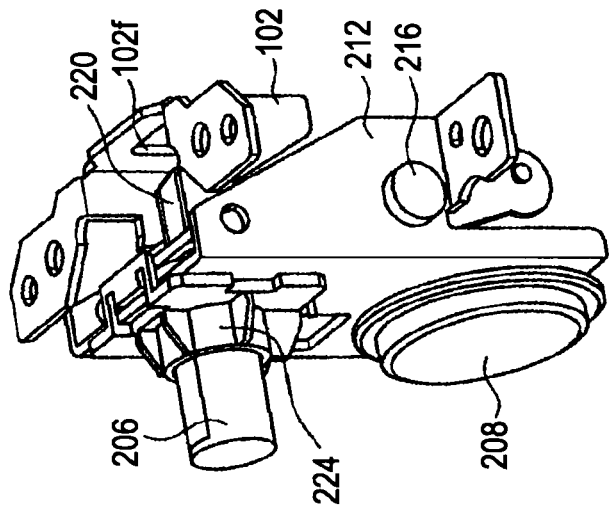
Figure 9A:
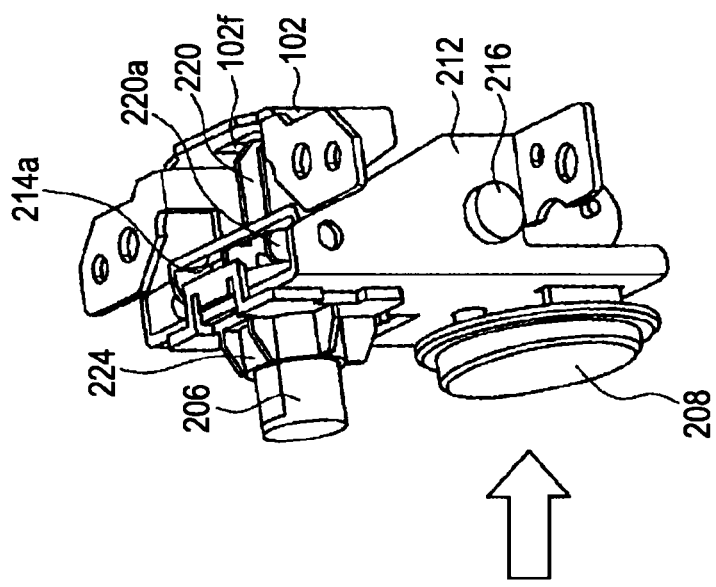

FIGS. 9A and 9B schematically illustrate retraction of the lock shaft 220 from the opening 102f of the hook fitting 102 during demounting of the body unit 200 from the ceiling unit 100. As illustrated in FIG. 9A, when the release button 208 is pushed in, the lock plate 214 pivots in a direction opposite to the direction of arrow A3 in FIG. 3. Thus, the openings 214b of the lock plate 214 and the engaging portions 102b of the hook fitting 102 are first disengaged from each other.

The lock shaft 220 has a protruding portion 220a which abuts the surface 214a of the lock plate 214. The protruding portion 220a protrudes further above an upper edge of the opening 102f of the hook fitting 102. When the release button 208 is further pushed in, the protruding portion 220a is pressed by the surface 214a and the lock shaft 220 (i.e., the lock button 206) is moved in a direction opposite to the direction of arrow A5 in FIG. 3. In this manner, as illustrated in FIG. 9B, the lock shaft 220 and the opening 102f are disengaged from each other to allow demounting of the body unit 200 from the ceiling unit 100.

Hereinafter, a case in which the body unit 200 is to be mounted to the ceiling unit 100 with the lock button 206 being already pushed in will be described. Since the lock shaft 220 and the opening 102f engage each other only after the lock button 206 is pushed in, it is necessary to return the lock button 206 to a retracted position if the lock button 206 is already pushed in before the body unit 200 is mounted to the ceiling unit 100. In the present embodiment, a sloped surface 220b is provided at an end of the lock shaft 220, which abuts the sloped surface 102d of the hook fitting 102 in the event that the lock button 206 is pushed in before the body unit 200 is mounted to the ceiling unit 100. The abutment of the sloped surface 220b and the sloped surface 102d causes the lock button 206 to return to the retracted position.

FIGS. 10A to 10C schematically illustrate mounting of the body unit 200 to the ceiling unit 100 with the lock button 206 located at a pushed-in position. As illustrated in FIG. 10A, the sloped surface 220b formed at the end of the lock shaft 220 first abuts the sloped surface 102d of the hook fitting 102. As the body unit 200 is moved toward the ceiling unit 100, the lock button 206 is moved in the direction of an arrow in FIG. 10A while the sloped surface 220b and the sloped surface 102b slide each other. Then, the lock button 206 returns to its retracted position. With this configuration, the openings 214b of the lock plate 214 and the engaging portions 102b of the hook fitting 102 engage each other without any interference between the lock shaft 220 and the hook fitting 102. The lock button 206 is then pushed in from the state illustrated in FIG. 10B so that the lock shaft 220 engages the opening 102f.

Figure 11:
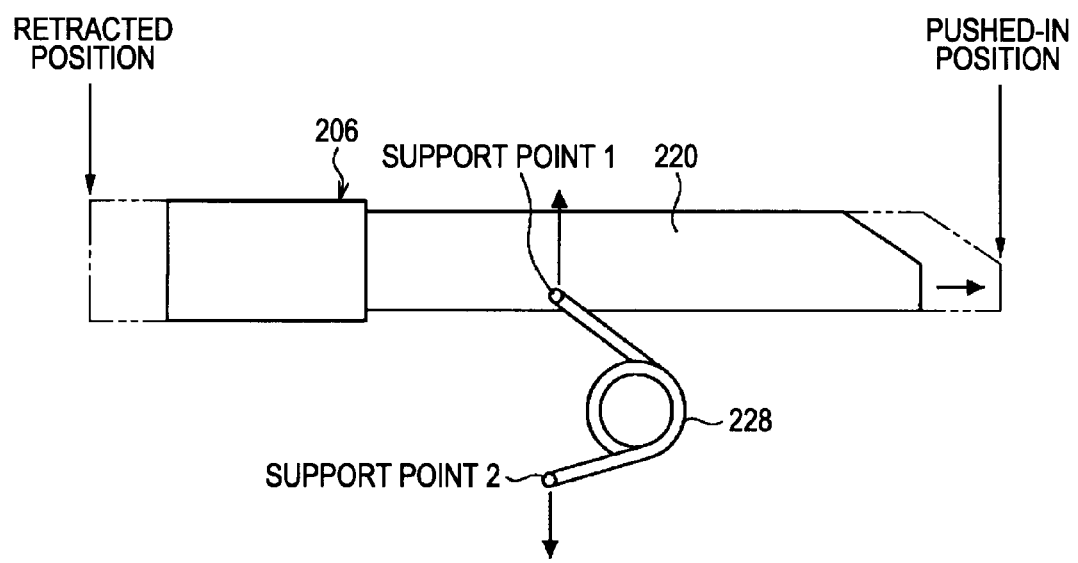
FIG. 11 schematically illustrates a toggle mechanism provided in the lock button.

FIG. 11 schematically illustrates a toggle mechanism provided in the lock button 206. As illustrated in FIG. 11, a twisted coil spring 228 is connected to the lock shaft 220. The twisted coil spring 228 is rotatably connected to the lock shaft 220 at one end (i.e., a support point 1) and is rotatably connected to the base plate 212 at the other end (i.e., a support point 2). The twisted coil spring 228 applies urging force to the lock shaft 220 in the direction of an upward arrow at the support point 1 and to the base plate 212 in the direction of a downward arrow at the support point 2. FIG. 11 illustrates the lock button 206 located at an intermediate position between the pushed-in position and the retracted position. In this state, the distance between the support point 1 and the support point 2 become the smallest whereas the urging force of the twisted coil spring 228 becomes the largest.

The thus-structured toggle mechanism constituted by the twisted coil spring 228 prevents the lock button 206 to remain located at the intermediate position illustrated in FIG. 11. Accordingly, the lock button 206 is located either at the pushed-in position or at the retracted position. When the user pushes in the lock button 206 from the retracted position, the lock button 206 is moved toward the pushed-in position. After the lock button 206 passes the intermediate position illustrated in FIG. 11, the urging force of the twisted coil spring 228 acts on the lock shaft 220 to deliver the same to the pushed-in position. Accordingly, the user can push in the lock button 206 with the minimum force. Also in the retraction of the lock button 206 described with reference to FIGS. 9 to 10C, the urging force of the twisted coil spring 228 delivers the lock button 206 to the retracted position after the lock shaft 220 passes the intermediate position illustrated in FIG. 11. Accordingly, the lock button 206 can be reliably moved to the retracted position also in the retracting operation. As described above, since the lock button 206 is operated with the urging force of the twisted coil spring 228, the user can push in the lock button with relatively small force. When the user operates the release button 208, on the other hand, it is necessary to push in the release button 208 against the urging force of the twisted coil spring 218. In order to reduce a load of the user when pushing in the release button 208, the area of the release button 208 is designed larger than that of the lock button 206 in the outer circumferential surface of the body unit 200. Such a configuration helps the user to push in the release button 208 against the urging force of the twisted coil spring 218.

4. Planar Configuration of Body Unit

Figure 12:
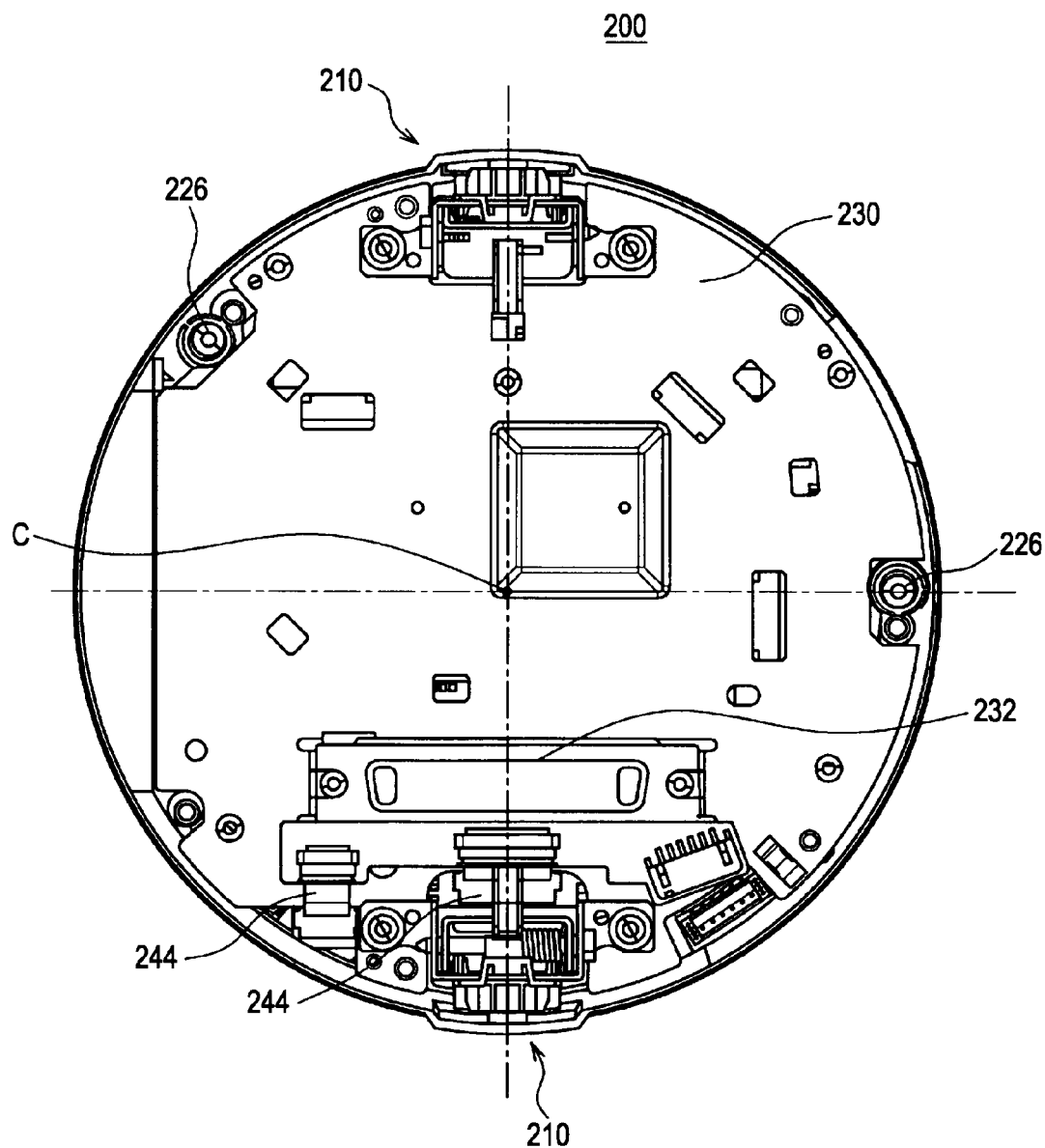
FIG. 12 is a top view of the body unit.

Hereinafter, a planar configuration of the body unit 200 will be described. In particular, for example, positional relationships between a circuit board provided in the body unit 200 and the locking mechanism section 210 will be described. FIG. 12 is a top view of the body unit 200. As illustrated in FIG. 12, a circuit board 230 is disposed on the body unit 200 along a direction perpendicular to the central axis C of a cylindrical outer circumferential surface. The circuit board 230 is made of a hard board and is fixed to the body unit 200.

The circuit board 230 includes a connector 232 for electrical connection with the ceiling unit 100. The ceiling unit 100 includes a connector for connection with the connector 232 at a position corresponding to the position of the connector 232. When body unit 200 is mounted to the ceiling unit 100, the connector 232 is connected to the connector of the ceiling unit 100. Thus, when the body unit 200 is mounted to the ceiling unit 100, the electrical connection is established between these units immediately. The electrical connection provides a power source line, an audio I/O line and a communication line over wired LAN for transmitting videos and other lines.

The body unit 200 has plural bosses 226 projecting toward the ceiling unit 100. The ceiling unit 100 has boss holes (not illustrated) at positions corresponding to those of the bosses 226 for receiving the bosses 226. With the bosses 226 disposed in the boss holes and ends of the bosses 226 abutting bottoms of the boss holes, the body unit 200 and the ceiling unit 100 are horizontally aligned with each other and the relative angular positions thereof are determined. When the ends of the bosses 226 abut the bottoms of the boss holes, the body unit 200 is vertically aligned with the ceiling unit 100. At the same time, the openings 214b of the lock plate 214 engage the engaging portions 102b. Thus, the lock shaft 220 can be disposed to pass through the opening 102f.

Figure 13:
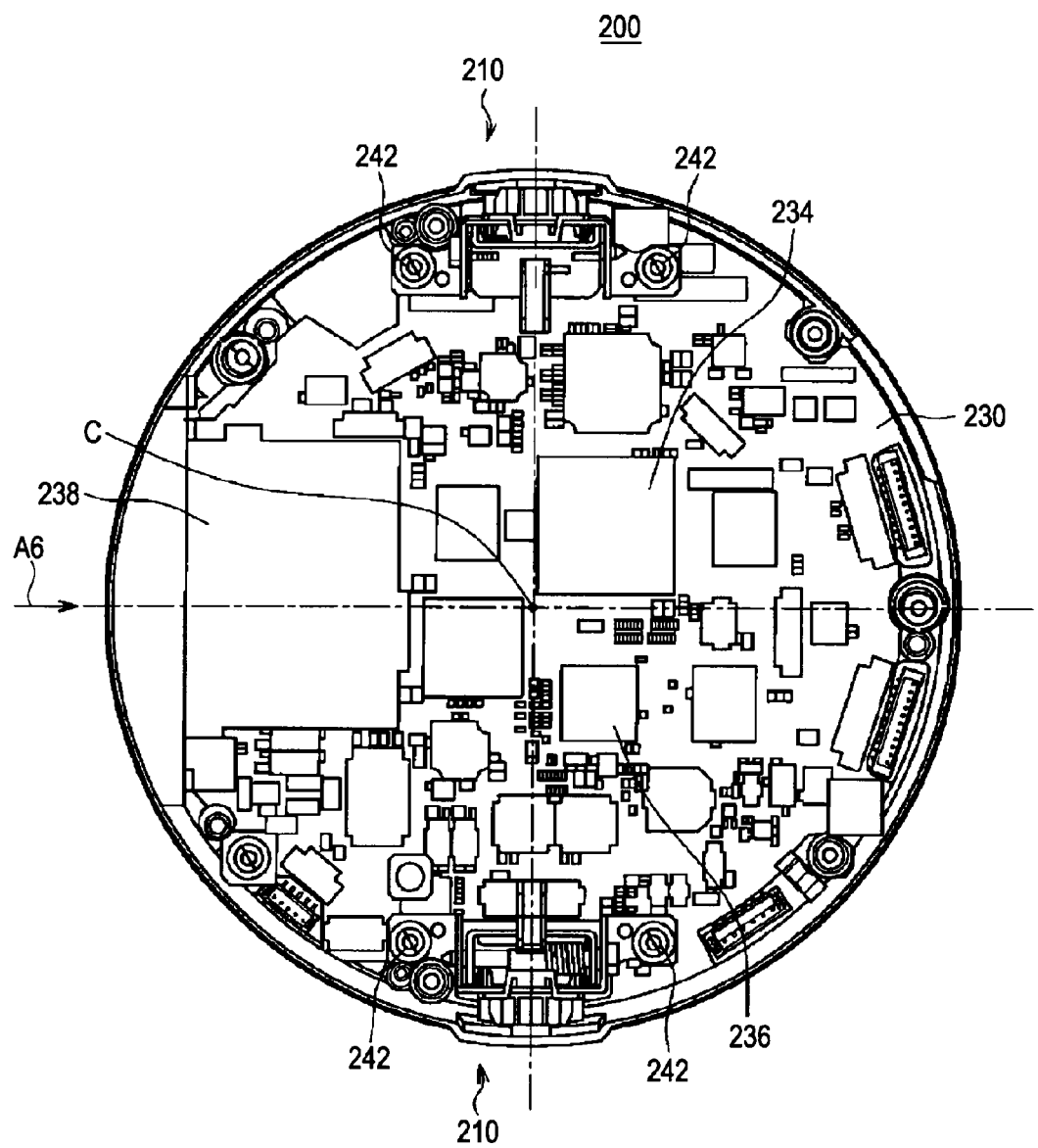
FIG. 13 is a bottom view of the body unit, the locking mechanism and a circuit board.

FIG. 13 is a bottom view of the body unit 200, the locking mechanism 210 and the circuit board 230. As illustrated in FIG. 13, the locking mechanism 210 is fixed to the body unit 200 in the following manner. Screws 242 are fastened to a mounting surface of the body unit 200 via the screw holes 212d with the mounting surfaces 212e of the base plate 212 abutting the mounting surface of the body unit 200. As illustrated in FIG. 13, electronic parts, such as a main processor 234 and an image processing IC 236, are mounted on a lower surface of the circuit board 230. A CF card connector 238 is mounted on the circuit board 230.

The CF card connector 238 is disposed at a position corresponding to the position of the card receiving section 240 illustrated in FIG. 1. A wireless LAN card, a memory card and other cards are inserted in the CF card connector 238. The card receiving section 240 is located at a position corresponding to a position represented by an arrow A6 in FIG. 13 and is apart from both the locking mechanism sections 210 at 90 degrees about the central axis C. With this configuration, the card receiving section 240 and the locking mechanisms 210 do not interfere with one another on the outer circumferential surface of the body unit 200.

As illustrated in FIG. 12, the connector 232 is located near one of the locking mechanism sections 210 and at the same angular position as that of the one of the locking mechanism sections 210 about the central axis C. With this configuration, the connector 232 and the CF card connector 238 are located on opposite surfaces of the circuit board 230 to make no interference therebetween. A flexible substrate 244 connected to the connector 232 may also be handled without difficulty.

As described above, according to the present embodiment, the lock plate 214 of the locking mechanism 210 provided in the body unit 200 engages the hook fitting 102 of the ceiling unit 100 whereas the lock shaft 220 engages the hook fitting 102. In this manner, the body unit 200 is fixed to the ceiling unit 100 at two different engaging portions. Accordingly, inadvertent removal of the body unit 200 from the ceiling unit 100 can be avoided in the event that the engaging portions 102b of the hook fitting 102 and the openings 214b are disengaged from each other. When not pushed in, the lock button 206 projects from the outer circumferential surface of the body unit 200. Thus, the user can easily recognize from the appearance that the lock button 206 is not pushed in yet. When recognizing that the lock button 206 is not pushed in yet from the appearance, the user pushes the lock button 206 in. In this manner, the body unit 200 can be completely connected to the ceiling unit 100.

The present application contains subject matter related to that disclosed in Japanese Priority Patent Application JP 2009-076406 filed in the Japan Patent Office on Mar. 26, 2009, the entire content of which is hereby incorporated by reference.

While a preferred embodiment of the invention has been described in detail with reference to the accompanying drawings, such description is for illustrative purposes only and it will be obvious to those of ordinary skill in the art that various changes and modifications may be made without departing from the spirit and scope of the appended claims. These changes and modifications should be considered to be within the scope of the invention.

What is claimed is:

1. An image-capturing device mounting mechanism, comprising:
    an anchoring unit fixed to a building, the anchoring unit including at least one securing device;
    a camera body unit with a capturing lens and a secure locking mechanism, the body unit mounted to and demounted from the anchoring unit, the secure locking mechanism further comprising:
        a first engaging portion provided with the secure locking mechanism for an engagement between the body unit and a first portion of the securing device of the anchoring unit when the body unit is mounted to the anchoring unit;
        a second engaging portion provided with the secure locking mechanism for an engagement between the body unit and a second portion of the securing device of the anchoring unit different from the first portion, when the first engaging portion engages the anchoring unit,
    a first operating section provided on an outer surface of the body unit for operating the first engaging portion; and
    a second operating section provided in the outer surface of the body unit for operating the second engaging portion, the second engaging portion is configured to be pushed in by a user to engage the anchoring unit when the first engaging portion and the anchoring unit are in engagement with each other.

2. The image-capturing device mounting mechanism according to claim 1, further comprising an operating section for operating the second engaging portion, the operating section projecting from an outer surface of the body unit when the second engaging portion and the anchoring unit are not in engagement with each other.

3. The image-capturing device mounting mechanism according to claim 1, wherein a disengaging direction of the first engaging portion and a disengaging direction of the second engaging portion are the same and the second engaging portion and the anchoring unit are disengaged from each other when the first engaging portion and the anchoring unit are disengaged from each other.

4. The image-capturing device mounting mechanism according to claim 1,
    wherein the first operating section is disposed below the second operating section.

5. The image-capturing device mounting mechanism according to claim 4, wherein an area of the first operating section in the outer surface of the body unit is larger than an area of the second operating section in the outer surface of the body unit.

6. The image-capturing device mounting mechanism according to claim 1, wherein the anchoring unit includes a retracting section for retracting the second engaging portion to a position at which the second engaging portion and the anchoring unit are not in engagement with each other during mounting the body unit to the anchoring unit.

7. An image-capturing device comprising:
    an anchoring unit fixed to a building, the anchoring unit including at least one securing device;
    a camera body unit with a capturing lens and a secure locking mechanism, the body unit mounted to and demounted from the anchoring unit, the secure locking mechanism further comprising:
        a first engaging portion provided with the secure locking mechanism for an engagement between the body unit and a first portion of the securing device of the anchoring unit when the body unit is mounted to the anchoring unit; and
        a second engaging portion provided with the secure locking mechanism for an engagement between the body unit and a second portion of the securing device of the anchoring unit different from the first portion, when the first engaging portion engages the anchoring unit,
    a first operating section provided on an outer surface of the body unit for operating the first engaging portion; and
    a second operating section provided in the outer surface of the body unit for operating the second engaging portion, the second engaging portion is configured to be pushed in by a user to engage the anchoring unit when the first engaging portion and the anchoring unit are in engagement with each other.

8. The image-capturing device according to claim 7, further comprising:
    a first connector provided in the anchoring unit for establishing an electrical connection between the anchoring unit and the body unit;
    a second connector provided in the body unit to be connected to the first connector; and
    a circuit board provided in the body unit on which the second connector is mounted,
    wherein:
    the body unit is cylindrically shaped;
    two locking mechanism sections are provided at an outer circumferential surface of the body unit at opposing locations spaced 180 degrees apart from each other; and the second connector is provided in the same angular position as that of one of the two locking mechanisms with respect to a central axis of the cylindrical-shaped body unit.

9. The image-capturing device according to claim 8, wherein a card connector is mounted on the circuit board for receiving a wireless LAN card or a memory card, the card connector being located apart from one of the locking mechanism sections at 90 degrees about the central axis of the cylindrical-shaped body unit.

* * * * *